United States Patent [19]

Needham et al.

[11] 3,726,252

[45] Apr. 10, 1973

[54] AUTOMATIC MILKER

[75] Inventors: Lyle L. Needham, Bellwood; Robert J. Shulick, St. Charles; Harold V. Swanson, Downers Grove, all of Ill.

[73] Assignee: Babson Bros. Co., Oak Brook, Ill.

[22] Filed: Jan. 11, 1971

[21] Appl. No.: 105,170

[52] U.S. Cl. ............................................ 119/14.08
[51] Int. Cl. .................................................. A01j 7/00
[58] Field of Search ................................... 119/14.08

[56] References Cited

UNITED STATES PATENTS

| | | | |
|---|---|---|---|
| 3,115,116 | 12/1963 | Schilling et al. | 119/14.08 |
| 3,556,053 | 1/1971 | Padman | 119/14.08 |
| 2,496,307 | 2/1950 | Perkins | 119/14.08 |

Primary Examiner—Hugh R. Chamblee
Attorney—Hofgren, Wegner, Allen, Stellman & McCord

[57] ABSTRACT

An automatic shutoff milker including four teat cup assemblies connectable with an animal's teats and a milk flow passage from each assembly through an accumulation well and into a milk receiving bowl. Four piston and cylinder devices are mounted generally horizontally within a recess on the underside of a base portion for the apparatus, and a flexible cable is connected between each piston and a teat cup assembly for applying pull to the assembly in response to movement of the piston. A sensing probe is disposed within each accumulation well to sense a flow of milk through said passage. The sensing probe is operably connected electrically to the respective piston and cylinder device to actuate the piston for applying a pull to the teat cup assembly when there is a predetermined flow condition of milk in said passage. The flexible cable is removably connected by universal joints to the piston and to the teat cup assembly.

22 Claims, 6 Drawing Figures

PATENTED APR 10 1973 3,726,252

INVENTORS
LYLE L. NEEDHAM
ROBERT J. SHULICK
HAROLD V. SWANSON

BY Hofgren, Wegner, Allen, Stellman & McCord
ATTORNEYS

AUTOMATIC MILKER

BACKGROUND AND SUMMARY OF THE INVENTION

This invention relates to a mechanical milker and more particularly to a mechanical milker incorporating an automatic shutoff of the milking operation as the animal is milked out.

Present day mechanical milkers utilize a double action milking operation in which a continuous vacuum is applied to the end of the animal's teats and the teats are alternately massaged and released. This operation is provided by a teat cup unit including a rigid outer shell and a flexible liner or inflation which is applied to the teat. A continuous vacuum inside the inflation draws the milk from the teat and through the inflation into further milk handling apparatus such as a bucket or milk line. The space between the inflation and the shell is alternately evacuated, expanding the inflation and releasing the teat, and opened to air, collapsing the inflation about the teat, providing rest and massage. If the milker is left on the cow after all of the milk has been withdrawn from the udder, the continued application of vacuum irritates the tissues of the teat and may cause infection and permanent damage. This problem is further complicated by the fact that the four quarters of the cow's udder normally do not require the same period of time to milk out so that the milking operation should be stopped and the teat cup removed from each quarter at a different time. Where one man is handling several milker units, it is difficult for him to watch each unit closely enough to determine when each teat cup should be removed.

Efforts have been made to provide a milker which shuts off automatically on the cessation of flow of milk. Some of these milkers have incorporated float valves of one type or another which seat when the milk flow drops below a minimum value, shutting off vacuum to the interior of the inflation. If air is admitted to the interior of the inflation, the teat cup will fall from the teat under its own weight. This is generally undesirable because it requires a greater capacity in the vacuum system. In addition, the mechanism in the milk flow passage, including the float and valve member and float chamber, for example, greatly complicates the sanitary problems of the dairyman.

Exemplary of other efforts to provide an automatic shutoff milker is the milker shown in U. S. Letters Patent No. 3,115,116 to Schilling et al., Dec. 24, 1963. In the structure shown in this patent, the flow of milk through the inflation from the cow's teat is sensed electrically and a piston and cylinder device is utilized to apply a pull to the teat cup assembly. A vacuum system is utilized for actuating the piston and cylinder device to pull the teat cup assembly physically from the cow's teat. Initial pulling on the teat cup assemblies will cause the inflation to "kink" over the opening on the outer end of the connector nipple for the inflation, cutting off the vacuum to the inflation, and the teat cup assembly will fall from the teat under its own weight.

In the Schilling patent structure, a rigid member extends from the piston, with a hook portion disposed over the top of the inflation stem to pull on the inflation in response to the cessation of milk flow through the inflation. Such rigid hooks have the disadvantage of being inflexible and incapable of position adjustment for various sized udders and/or cows. In addition, if there is a major failure in the shutoff system, the rigid hooks cannot readily be removed so as to permit conventional mechanical milking without the automatic shutoff.

A principal object of this invention is to provide a new and improved mechanical milker incorporating an automatic shutoff of the milking operation as the animal is milked out.

Another object of the invention is to provide a new and improved automatic shutoff milker wherein the milk flow is sensed electrically and the teat cup assemblies are pulled individually from the cow's teats upon the cessation of milk flow from the individual teats.

In the preferred embodiment of the invention, the automatic shutoff milker has milk withdrawing means including a teat cup assembly connectable with an animal's teat and with a milk flow passage from the teat cup assembly. A piston and cylinder device is mounted on the milk withdrawing means and a flexible cable-like member is connected between the piston and the teat cup assembly for applying pull to the assembly in response to movement of the piston. Means operably associated with the milk flow passage is provided for sensing a flow condition of milk in the passage. Means responsive to the sensing means is provided for actuating the piston to apply pull to the teat cup assembly through the flexible cable-like member. The cable provides for flexibility to permit positioning of the teat cup assemblies for various sized cows and/or udders.

A feature of the invention is that the flexible cables are removably connected to the teat cup assemblies and to the pistons so that the cables may be replaced. In addition the cables may be removed from the teat cup assemblies so that mechanical milking can take place without the automatic shut-off. Preferably, the connections between the ends of the flexible cables and the pistons and teat cup assemblies comprise universal joints so that the ends of the cables can swivel relative to the pistons and the teat cup assemblies to eliminate breakage of the cables due to flexing at the ends thereof.

Another feature of the invention is that the piston and cylinder devices are mounted entirely within a recess on the underside of the milk withdrawing means to protect the piston and cylinder devices from damage, as by a cow kicking the milk withdrawing means, for instance. Preferably, the piston and cylinder devices are mounted within the recess generally horizontally in order to reduce the overall height of the milk withdrawing apparatus.

A further feature of the invention is to provide a new and improved unitary accumulation well mounted on the top of the milk receiving bowl of the milk withdrawing apparatus, with an electrical sensing probe assembly removably mounted in an upper open end of the accumulation well. A probe extends downwardly into a lower well portion disposed in the interior of the milk receiving bowl. The probe assembly forms a cap closing the open top of the accumulation well.

Other objects, features and advantages of the invention will become apparent from the following detailed description taken in connection with the accompanying drawings.

DETAILED DESCRIPTION OF THE INVENTION

The invention as disclosed herein is incorporated in a carry-away milking system, i.e., one in which the milk flows directly into a milk line through which it is conducted to a bulk holding tank or the like. It is to be understood that the invention could also be used with other milkers, as a suspended bucket.

Figure 1:
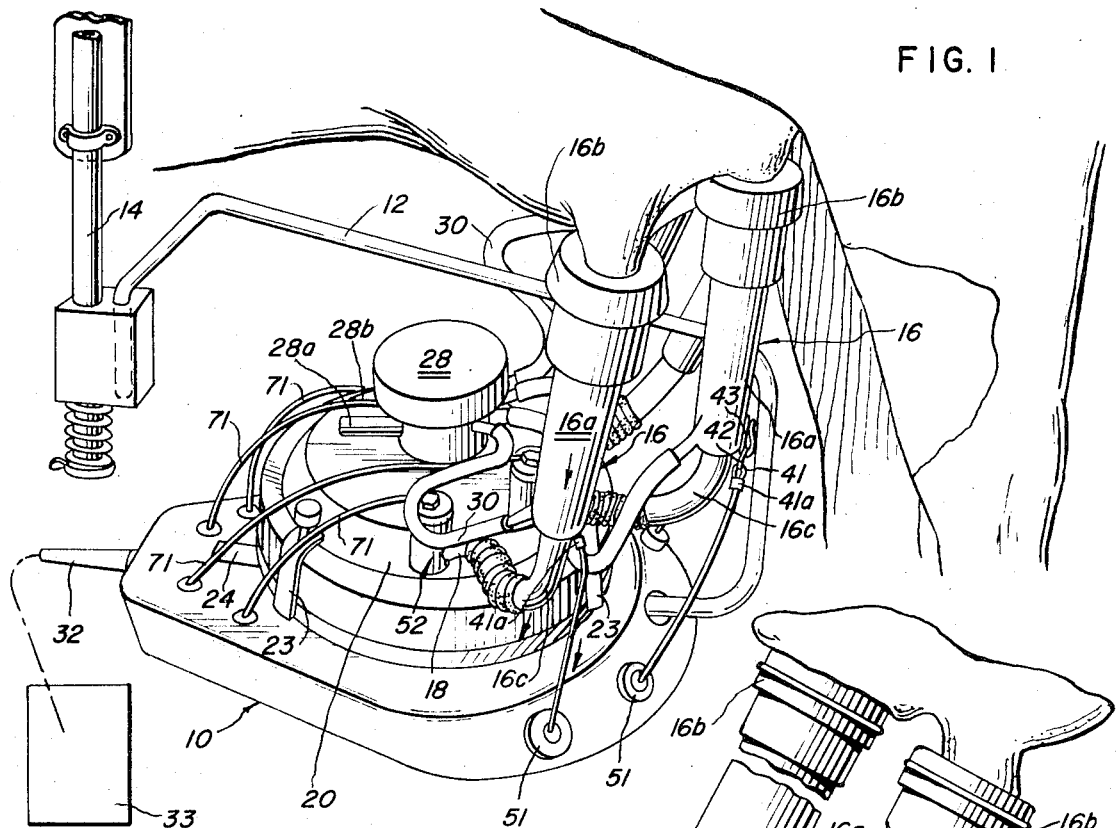
FIG. 1 is a perspective view of the milker of the present invention, in use on a cow.

Referring first to FIG. 1 of the drawings, the milker apparatus, generally designated 10, is carried beneath a cow on an arm 12 connected to a supporting apparatus 14 which is connected to appropriate structure in a parlor stall, or the like. The milker 10 includes four teat cup assemblies 16, each of which includes a rigid outer shell 16a and a flexible inner liner or inflation 16b which is connectable with a cow's teat. The inflation extends through the rigid outer shell 16a, and has a stem portion 16c which is connected to a nipple 18 of an accumulation well (to be described in greater detail hereinafter) mounted in the upper wall or cover 20 of a milk receiving bowl, generally designated 22. The cover is secured in place by appropriate clamps 23. An outlet nipple 24 from the milk receiving bowl 22 is connected to a milk hose 26 (FIG. 2) of an evacuated milk line which carries the milk away to a bulk holding tank or the like. A pulsator valve 28 (FIG. 1) mounted on top of the milker 10 has nipples 28a and 28b for connection to appropriate hoses which lead to a vacuum line and pulsator control as shown in U. S. Letters Patent No. 3,307,585 to Schilling et al. The pulsator is operated by vacuum control signals providing alternate vacuum and air through hoses 30 to the rigid shells 16a of the teat cup assemblies 16.

Figure 3:
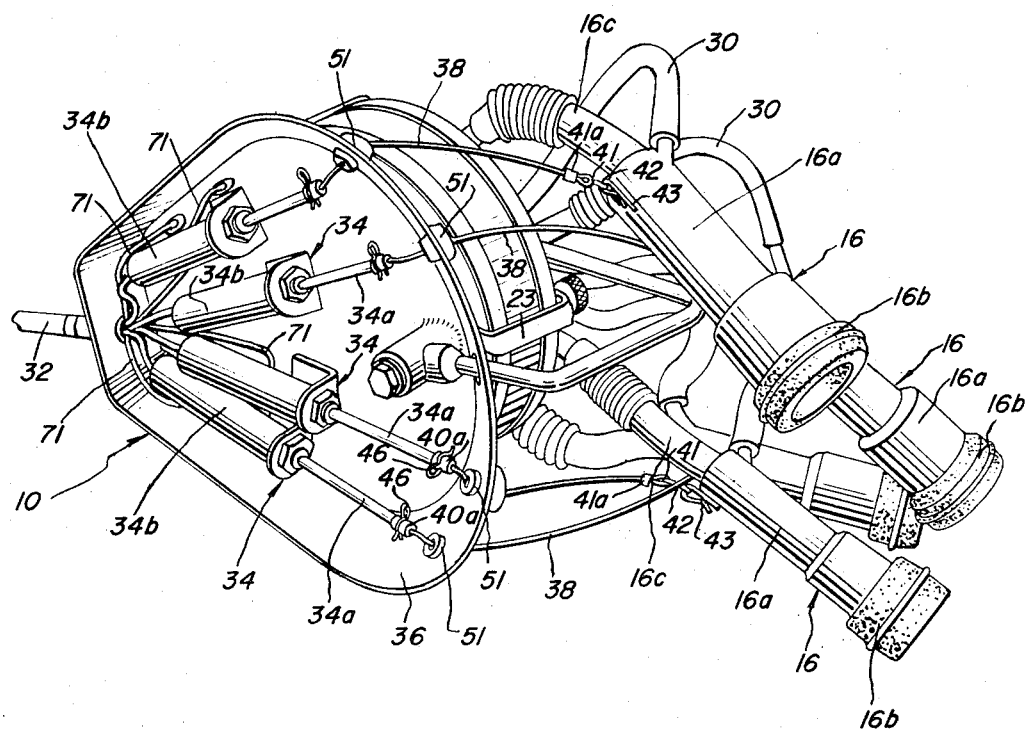
FIG. 3 is a perspective view of the milker looking at the underside thereof.
Figure 4:
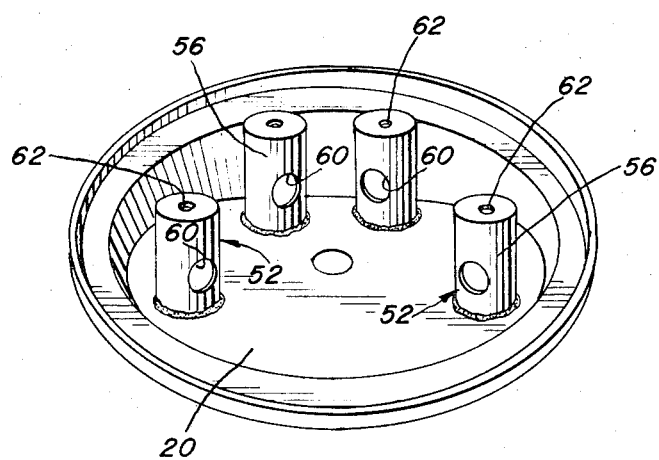
FIG. 4 is a perspective view of the underside of the cover for the milk receiving bowl of the milker.

A multiple passage control hose 32 (FIGS. 1 and 3) is connected between a control unit 33 and a piston and cylinder assembly on the underside of the milker, as best seen in FIG. 3 and described in greater detail hereinafter. The control unit may be that of the Schilling et al. U.S. Pat. No. 3,115,116. As will appear, a separate piston and cylinder device is provided for each of the teat cup assemblies, the piston being operatively connected with the associated teat cup. A sensing means detects cessation of flow of milk through the teat cup and actuates the piston to apply a downward pull to the cup. The downward force physically pulls the teat cup unit to a position, as shown best in FIG. 6, where the stem portion 16c of the inflation seals with the end of nipple 18 and cuts off the vacuum to the inflation. Further downward force pulls the teat cup assembly from the animal's teat.

Figure 2:
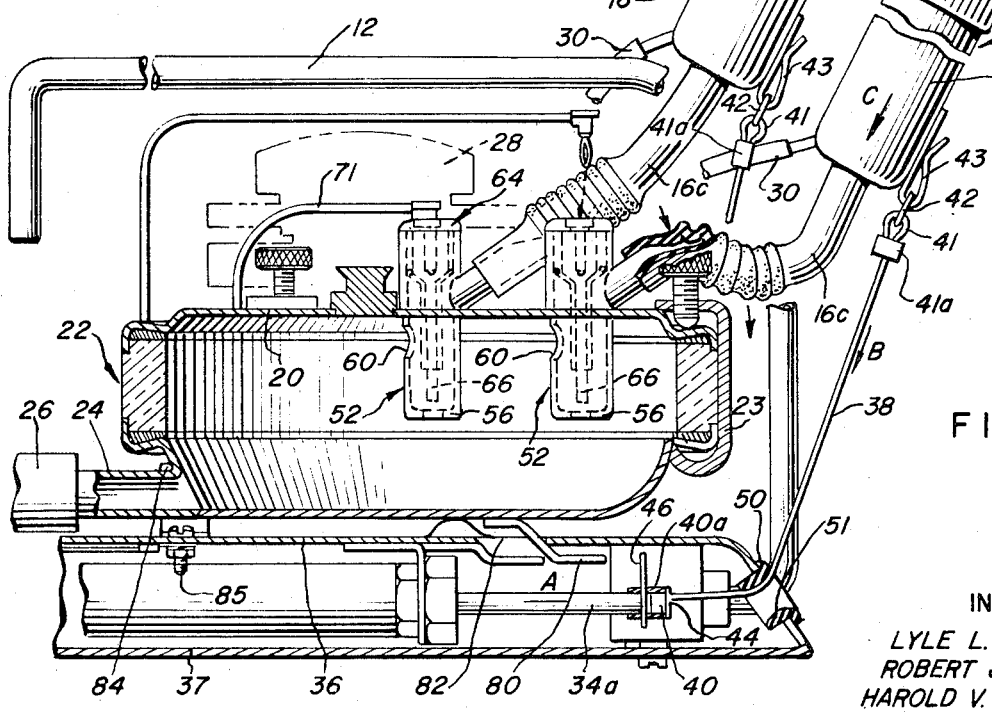
FIG. 2 is a fragmentary vertical section through the milker shown in FIG. 1.
Figure 6:
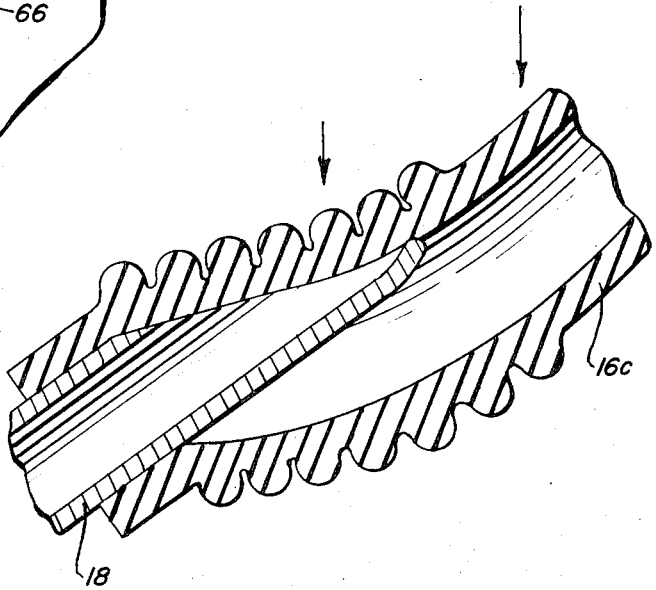
FIG. 6 is a fragmentary, vertical section through the inlet nipple portion of the accumulation well shown in FIG. 5, with the inflation stem shown pulled down and blocking the inlet of the nipple.

Referring more particularly to FIGS. 2 and 3, the piston and cylinder assembly on the underside of the milker 10 comprises four piston and cylinder devices, generally designated 34, each having a piston 34a and a cylinder 34b. The piston and cylinder devices 34 are disposed entirely within a recessed base portion 36 of the milker on the underside thereof to prevent damage to the piston and cylinder devices, as by a cow kicking the milker, for example. A cover plate 37 (FIG. 2) may be provided on the underside of the base portion 36 to enclose the piston and cylinder devices. A flexible cable-like member 38 is connected between each of the pistons 34a and the rigid shell portions 16a of one of the four teat cup assemblies 16. Thus, when the sensing means (to be described hereinafter) detects a cessation of flow of milk from one of the teat cup assemblies, the respective piston 34a will move in the direction of arrow A (FIG. 2) pulling the flexible cable 38 therewith in a downward and forward direction (arrow B) and pulling the teat cup assembly 16 therewith downwardly and forwardly in the direction of arrow C. As best seen in FIGS. 2 and 6, the downward and forward force on the teat cup assembly, by pulling on the flexible cables 38, causes the stem portion 16c of the inflation 16 to block off the end of nipple 18. This cuts off the vacuum to the interior of the inflation. Further movement of the piston 34a pulling on the flexible cable 38 will pull the teat cup assembly from the animal's teat while the remaining teat cup assemblies remain operative.

The flexible cables 38 preferably are connected at their ends to the pistons 34a and the shells 16a by universal joints to permit the ends of the cables to swivel relative to the pistons and shells to avoid breaking the flexible cables at their ends due to flexing. Braided metal cables have proved effective for the intended purposes herein. As seen in FIG. 2, the universal joints between the ends of the cables and the pistons 34a are of the ball and socket type, with balls 40 secured to the ends of the flexible cables 38. A sleeve member 40a is telescoped over each of the pistons 34a. The sleeves 40a form sockets for the balls 40 on the ends of the flexible cables 38, with the flexible cables extending through openings 44 in the base of the sleeves. Snap-in spring clips 46 extend through aligned apertures in the sleeves 40a and the pistons 34a to removably secure the flexible cables to the pistons. Referring again to FIG. 2, the universal joints between the opposite ends of the cables 38 and the teat cup assembly shells 16a are formed by a loop 41 at the ends of the cables which is linked to a ring 42 which, in turn, is snapped into a snap clip 43 fixed to the teat cup assembly shells 16a. The loop 41 is maintained at the ends of the flexible cables by clamps 41a. The loop-ring-clip joint provides a quick connect between the cables and the teat cup assembly shells so that the cables may easily be removed from the teat cup assembly shells to permit the teat cup assemblies to be washed, for instance. The cables also may be completely removed from the pistons 34a, for replacement purposes, by removing the spring clips 46.

Not only do the flexible cables 38 provide for flexibility in the positioning of the teat cup assemblies for different sized cows and/or udders, but the flexible cables, extending through apertures 50 in the recessed base portion 36, permit the piston and cylinder devices to be disposed generally horizontal, as seen in FIG. 3. The horizontal disposition of the piston and cylinder devices reduces the overall height of the milker and provides for a compact unit. The apertures 50 are lined with bushings 51 of ceramic or similar hard wearing material. When the milker is properly positioned beneath a cow, the apertures 50 should be forward of the shells 16a so that the cables 38 will pull on the teat cup assemblies in a downward and forward direction.

Figure 5:
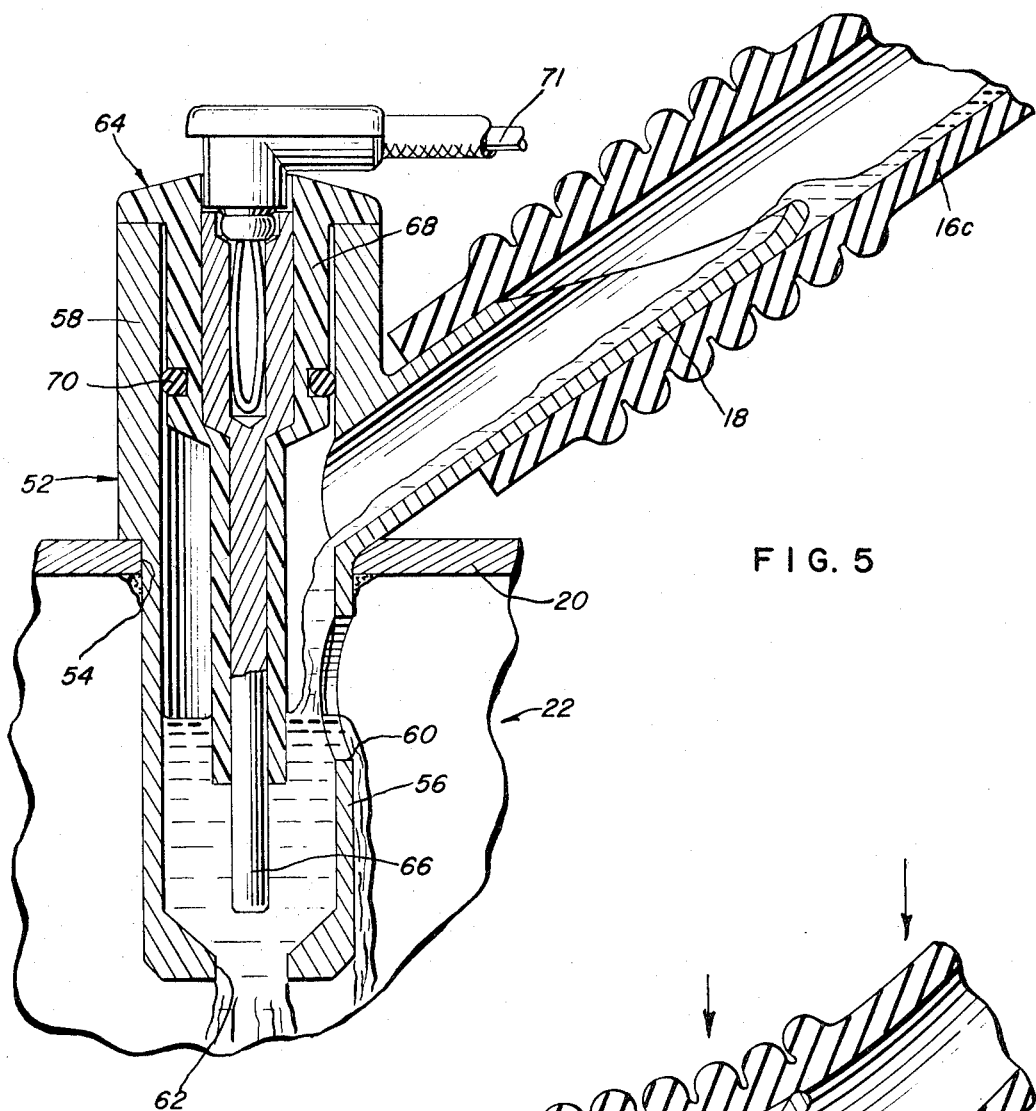
FIG. 5 is a fragmentary, vertical section, on an enlarged scale, through one of the unitary accumulation wells of the milker, with a sensing probe assembly positioned therein and with an inflation stem connected thereto.

Referring particularly to FIGS. 2, 3 and 5, unitary accumulation well members, generally designated 52, are fixedly secured to the cover 20 of the milk receiving bowl 22 of the milker and extends through apertures 54 in the cover. Four accumulation well members 52 are provided, one each for the four teat cup assemblies, and each has a well portion 56 disposed within the interior of the milk accumulation bowl 22 and an upper portion 58 protruding above the cover 20 of the milk receiving bowl 22. The nipple 18 protrudes outwardly and upwardly from the upper portion 58 for connection to the inflation stem 16c. The lower well portion 56 has an overflow opening or passage 60 on the side thereof and a bleeder orifice 62 through the bottom thereof. As best shown in FIG. 5, the milk which is withdrawn by vacuum from the cow's teat passes down through the inflation and into the inlet nipple 18, through the inlet nipple and into the well portion 56. When the well portion 56 is filled, the milk will overflow through the opening 60 and will flow partially through the bleeder orifice 62 into the bowl 22 of the milker.

The sensing means of the present invention includes a probe assembly, generally designated 64 (FIG. 5), mounted on the upper portion 58 of the accumulation well member 52, with an electrical sensing probe 66 extending downwardly into the well portion 56. As can be seen in FIG. 5, the upper portion 58 of the accumulation well member 52 has an open top and the probe assembly 64 forms a removable cap for the open top, with an insulating sleeve 68 disposed about the probe 66. An O-ring seal 70 is disposed about the upper end of the insulating sleeve 68. The probe 66 has lead wires 71 which extend through the control hose 32, as seen in FIGS. 1 and 3, and which are connected to appropriate circuitry in the control unit 33 to actuate the piston and cylinder devices when milk flow ceases.

In summary, so long as milk flows through the stem 16c of the inflation at a rate faster than the flow of milk through the bleeder orifice 62 of the accumulation well 52 the well portion 56 tends to fill and cause the milk to come into contact with the electrical probe 66, and the milking proceeds in a normal manner. Suitable starting time delay means, for instance with reference to that employed in the milker shown in the aforementioned Schilling patent, permits the operator to attach the teat cups to the animal and provide sufficient time for the milk to start flowing to fill the well portion 56 of the accumulation well member. As soon as the milk flow diminishes from any one quarter of the cow's udder to the point where the milk in the well portion 56 is not in contact with the probe 66, appropriate vacuum valving is opened admitting vacuum to the control hose 32 to the respective cylinder. The piston is drawn in the direction of arrow A (FIG. 2) applying a pull to the teat cup assembly to cause the inflation stem 16c to block off the entrance to the inlet nipple 18 and further movement of the piston causes the teat cup assembly to be pulled from the cow's teat.

It has been found that the size of the bleeder orifice 62 is of considerable importance. The orifice is shown exaggerated in FIG. 5. Through experimentation, it has been found that the orifice size should be approximately three-sixteenths of an inch + one-sixteenth inch. If the orifice is larger, the milk will flow directly through the accumulation well, through the bleeder orifice 62, without building up in the well portion 56. If the orifice is smaller, "flaky" or "stringy" milk tends to clog it and prevent the passage of milk therethrough.

In addition to the flexible cables 38 being removably secured to the pistons and teat cup assemblies, and the teat cup assemblies being removably mounted on the inlet nipples 18, the milk receiving bowl 22 also is removably mounted on the base portion 36 of the milker so that the bowl may be separated from the relatively expensive piston and cylinder control elements, for instance for washing purposes. To this end, a tongue 80 (FIG. 2) is fixed to the underside of the bowl 22 and is insertable through an opening 82 through the top of the milker base portion 36 so that the tongue underlies the roof of the base portion. A snap ring 84 is mounted as by bolt 85 to the top of the base portion 36 and snaps around the outlet nipple 24 to hold the milk receiving bowl 22 in position so that the tongue 80 on the bottom thereof cannot back out of the opening 82 in the base portion 36.

The foregoing detailed description has been given for clearness of understanding only and no unnecessary limitations should be understood therefrom as some modifications will be obvious to those skilled in the art.

We claim:

1. In a milker, milk withdrawing means including a teat cup assembly connectable with an animal's teat and a milk flow passage from said teat cup assembly, a piston and cylinder device mounted on said milk withdrawing means, a flexible cable-like member connected between said piston and said teat cup assembly for applying pull to said assembly in response to movement of said piston, means operably associated with said milk flow passage for sensing a flow condition of milk in said passage, and means responsive to said sensing means for actuating said piston to apply pull to said teat cup assembly through said flexible cable-like member.

2. The milker of claim 1 wherein said milk withdrawing means includes a lower base portion with said piston and cylinder device mounted thereon and said flexible cable extending upwardly therefrom for connection to said teat cup assembly.

3. The milker of claim 2 wherein said base portion has a recess within which is mounted said piston and cylinder device.

4. The milker of claim 3 wherein said recess is of a sufficiently large size relative to said piston and cylinder device that the piston and cylinder device is disposed entirely within the recess, the piston and cylinder device being disposed generally horizontal.

5. The milker of claim 3 wherein said recess is disposed on the underside of said base portion and the base portion has an upwardly extending opening through which said flexible cable extends for connection with said teat cup assembly.

6. The milker of claim 1 including a universal joint connecting one end of said flexible cable to said teat cup assembly to permit said end of the flexible cable to swivel relative to the teat cup assembly.

7. The milker of claim 1 including a universal joint connecting one end of said flexible cable to said piston to permit said end of the flexible cable to swivel relative to the piston.

8. The milker of claim 7 wherein said universal joint is of the ball and socket type, with a ball secured to said one end of the flexible cable and received in a socket mounted on an end of said piston.

9. The milker of claim 8 wherein said socket is formed on the end of a sleeve member which is telescoped over the end of said piston, and including removable retaining means for holding the sleeve telescopingly secured to said piston end.

10. The milker of claim 1 including means removably connecting one end of said flexible cable to said teat cup assembly to permit the teat cup assembly to be removed from the milk withdrawing means for washing or the like.

11. The milker of claim 10 including means removably connecting the other end of said flexible cable to said piston to permit the cable to be replaced.

12. The milker of claim 1 including means removably connecting one end of said flexible cable to said piston.

13. The milker of claim 1 wherein said piston and cylinder device is disposed on said milk withdrawing means such that the direction of movement of the piston is generally horizontal.

14. The milker of claim 13 wherein the point of connection of said cable to said piston is below and forward of the point of connection of the cable to said teat cup assembly when said milker is properly positioned below the animal so that the pull on the teat cup assembly when the piston is actuated is in a downward and forward direction.

15. The milker of claim 14 wherein said piston and cylinder device is disposed in a fore and aft direction relative to the milking position of the animal when the milker is properly positioned below the animal, and the piston when actuated moves in a forward direction.

16. The milker of claim 15 wherein said teat cup assembly has an inflation which is connected to an inlet nipple on said milk withdrawing means, the nipple being disposed forwardly of said teat cup assembly and having a generally upwardly opening inlet aperture whereby said inflation, when the teat cup assembly is pulled downwardly and forwardly by said cable, kinks over the inlet aperture of the nipple and shuts off vacuum to the inflation.

17. The milker of claim 15 including four piston and cylinder devices for four teat cup assemblies, the piston and cylinder devices being disposed side-by-side generally horizontally and extending generally in said fore and aft direction.

18. In a milker: milk withdrawing means including a teat cup assembly connectable with an animal's teat and having an inflation with a stem portion, a bowl for receiving milk from the inflation of said teat cup assembly, said bowl having an upper wall, an accumulation well member generally vertically disposed and extending through the upper wall of the bowl, the well member having a well portion disposed within the bowl and an upper portion exposed exteriorly of the bowl with an inlet nipple protruding from the upper portion for connection with the stem portion of said inflation, said well having means defining a flow passage from said nipple into said bowl, means sensing a flow of milk through said passage, and means operably associated with said assembly and responsive to said sensing means for applying a pull to said assembly when there is a predetermined flow condition of milk in said passage.

19. The milker of claim 18 wherein said sensing means includes a probe assembly mounted on the upper portion of said well member with a sensing probe extending downwardly into the well portion of said well member.

20. The milker of claim 19 wherein said probe assembly is removably mounted on the upper portion of said well member.

21. The milker of claim 20 wherein said well member has an open top and said probe assembly in part forms a removable cap for the open top of the well member.

22. The milker of claim 18 wherein said well portion disposed within said bowl has an overflow passage from the well portion to the interior of the bowl and a bleeder orifice at the bottom of the well portion, said bleeder orifice having a size of approximately three-sixteenths inch + one-sixteenth inch in diameter.

* * * * *